(12) United States Patent
Tanaka

(10) Patent No.: US 7,906,572 B2
(45) Date of Patent: Mar. 15, 2011

(54) RESIN COMPOSITION AND MOLDED ARTICLE

(75) Inventor: Yuuichirou Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 12/442,455

(22) PCT Filed: Jan. 29, 2009

(86) PCT No.: PCT/JP2009/051923
§ 371 (c)(1),
(2), (4) Date: Mar. 23, 2009

(87) PCT Pub. No.: WO2009/104478
PCT Pub. Date: Aug. 27, 2009

(65) Prior Publication Data
US 2010/0184900 A1 Jul. 22, 2010

(30) Foreign Application Priority Data
Feb. 22, 2008 (JP) .................. 2008-042179

(51) Int. Cl.
*C08K 5/09* (2006.01)
*C08G 63/00* (2006.01)

(52) U.S. Cl. ........................... 524/394; 525/437
(58) Field of Classification Search ............. 524/394
See application file for complete search history.

(56) References Cited

U.S. PATENT DOCUMENTS

| 2004/0232717 A1* | 11/2004 | Ariyasu ............... 296/1.11 |
| 2009/0018264 A1 | 1/2009 | Fuseya |
| 2009/0043018 A1 | 2/2009 | Tanaka et al. |
| 2009/0124763 A1* | 5/2009 | Matsuda et al. ........ 525/437 |

FOREIGN PATENT DOCUMENTS

| JP | 3852958 B2 | 9/2006 |
| WO | 2007/052847 A1 | 5/2007 |

* cited by examiner

Primary Examiner — Ling-Siu Choi
Assistant Examiner — Hui Chin
(74) Attorney, Agent, or Firm — Fitzpatrick, Cella, Harper & Scinto

(57) ABSTRACT

The invention provides a resin composition containing polyethylene furandicarboxylate with a suppressed temporal crystallization, and to a molded article which is molded with the resin composition and can realize the retention of physical properties and appearance thereof over a long period of time. The resin composition contains polyethylene furandicarboxylate and sodium montanate.

4 Claims, 1 Drawing Sheet

RESIN COMPOSITION AND MOLDED ARTICLE

TECHNICAL FIELD

The present invention relates to a resin composition and a molded article, and particularly to a resin composition containing plant-derived polyethylene furandicarboxylate with a suppressed temporal crystallization, and to a molded article molded with this composition.

BACKGROUND ART

In recent years, researches on resins synthesized from raw materials derived from plants without using petroleum have been extensively carried on in order to cope with environmental problems such as global warming and exhaustion of fossil resources. In particular, researches on polylactic acid as a resin derived from plants have been carried on, and various products have been introduced to practical applications.

Thermoplastic resins typified by polylactic acid are generally classified into non-crystalline resins and crystalline resins, and the latter resins can be crystallized by a heat treatment. In the case of the crystalline resin, its heat resistance and mechanical properties such as stiffness and impact resistance can be improved by crystallization, so that the resin is desirably crystallized before use rather than used in a non-crystalline state. However, since no crystallizing process is required so far as necessary physical properties are satisfied even in an amorphous state, such a resin is desirably used in the amorphous state because productivity in molding processes is excellent.

A problem to be solved when the resin is used in the amorphous state is how to inhibit crystallization caused with time. The reason for it is that when the resin is crystallized with time, changes in physical properties and deterioration of transparency may occur compared with those just after molding.

Polylactic acid that is a typical plant-derived resin has heretofore been applied to films and bottles, and techniques for ensuring transparency without being crystallized have been reported. For example, a technique of adding a fatty acid to a polylactic acid resin has been reported (Japanese Patent No. 3852958) to obtain a polylactic resin composition excellent in parting property.

On the other hand, polyethylene furandicarboxylate is known as a plant-derived resin. The merit of polyethylene furandicarboxylate is to have excellent heat resistance compared with polylactic acid. However, an additive for inhibiting crystallization with time in polyethylene furandicarboxylate has not been yet known.

DISCLOSURE OF THE INVENTION

The present invention has been made in view of such background art and has as its object the provision of a resin composition containing polyethylene furandicarboxylate with a suppressed temporal crystallization.

It is another object of the present invention to provide a molded article which is molded with the resin composition and can realize the retention of physical properties and appearance thereof over a long period of time.

In order to achieve the above objects, the present invention provides a resin composition comprising polyethylene furandicarboxylate and sodium montanate.

The present invention also provides a molded article molded with the above-described resin composition.

EFFECTS OF THE INVENTION

The present invention can provide the resin composition containing polyethylene furandicarboxylate with a suppressed temporal crystallization. The present invention can also provide the molded article which is molded with the resin composition and can realize the retention of physical properties and appearance thereof over a long period of time.

Further features of the present invention will become apparent from the following description of exemplary embodiments with reference to the attached drawings.

BEST MODE FOR CARRYING OUT THE INVENTION

Figure 1:
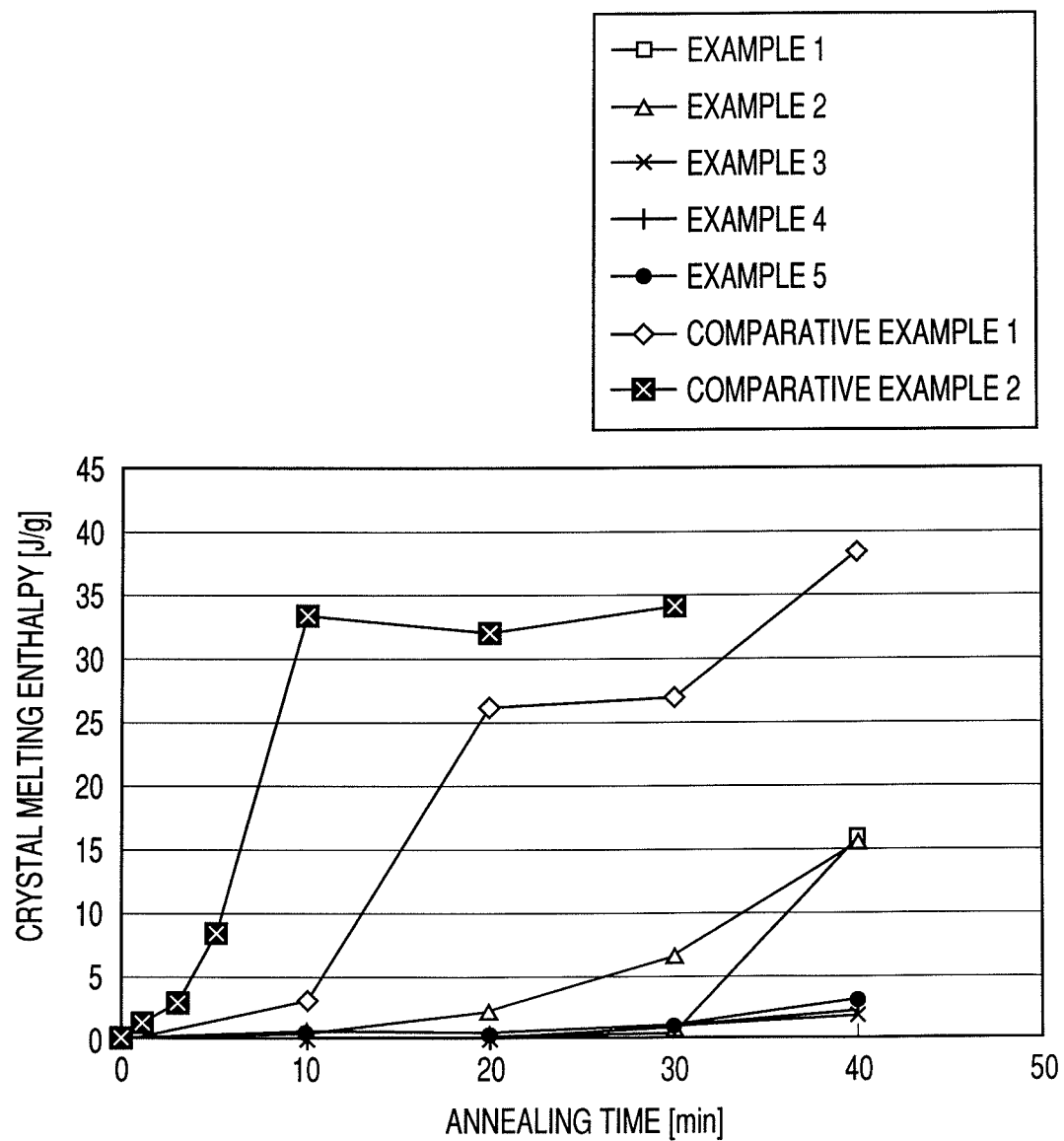
FIG. 1 diagrammatically illustrates comparison in the results of a crystallization-accelerating test between Examples and Comparative Examples in regard to the present invention.

The present invention will hereinafter be described in detail.

Crystallization of a resin is generally caused by some restraining force exerted on between polymer chains thereof after the polymer chains are orderly arranged. In order to inhibit the crystallization, there are several techniques: restraining the polymer chains before orderly arranged, incorporating a bulky structure to disturb the order, and making the polymer chains after the arrangement slippery to control the restraining force after the orderly arrangement. The present inventor has carried out extensive researches based on these three mechanisms. As a result, it has been found that sodium montanate is effective as a crystallization inhibitor for polyethylene furandicarboxylate. It has further been found that the effect depends not only on the structure of the crystallization inhibitor but also on its compatibility with the resin.

In other words, the resin composition according to the present invention contains polyethylene furandicarboxylate and sodium montanate.

Sodium montanate used in the present invention is composed of a sodium salt of a fatty acid having 27 carbon atoms and used for inhibiting the crystallization with time of polyethylene furandicarboxylate.

The content of sodium montanate contained in the resin composition according to the present invention is from 0.5 parts by weight or more to 10 parts by weight or less, favorably from 0.5 parts by weight or more to 5.0 parts by weight or less, more favorably from 0.5 parts by weight or more to 3.0 parts by weight or less, per 100 parts by weight of the total of polyethylene furandicarboxylate and sodium montanate. If the content is less than 0.5 parts by weight, it is difficult to inhibit the crystallization with time of polyethylene furandicarboxylate. If the content exceeds 10 parts by weight, the effect of inhibiting the crystallization is saturated, and the resulting resin composition shows deterioration of physical properties because the weight ratio of the resin is lowered.

The resin composition according to the present invention may contain various additives such as an inorganic filler, an elastomer, a flame retardant, an antioxidant, a light stabilizer, an ultraviolet absorbent, a hydrolysis inhibitor, a pigment and a dye as other components.

A method for adding sodium montanate to polyethylene furandicarboxylate will be described. A mixture of pellets of polyethylene furandicarboxylate and sodium montanate powder, which are mixed at a certain weight ratio in advance, is charged into a twin-screw kneader controlled to a temperature not lower than the melting point of the resin and kneaded for a certain period of time. The aggregated powder of sodium montanate is ground by shear stress generated by the screws of the kneader and uniformly dispersed in the resin to obtain a resin composition.

The resin composition thus prepared can be pelletized by a pelletizer.

The molded article according to the present invention can be obtained by molding the above-described resin composition. As examples of a molding method, may be mentioned injection molding, extrusion, blow molding and lamination molding.

The resin composition according to the present invention is obtained by adding sodium montanate to polyethylene furandicarboxylate and melt-kneading them and can realize the retention of physical properties and appearance of the resulting injection-molded product over a long period of time.

EXAMPLES

The present invention is described more specifically by the following Examples. However, the present invention is not limited by the following Examples.

Crystallization with time is mainly caused by crystallization of a resin due to the ambient heat. Thus, an acceleration test on crystallization with time was conducted by forcedly subjecting a resin composition to a heat treatment (annealing treatment) to evaluate the degree of inhibition of crystallization.

The specific method for evaluating the crystallization-inhibiting effect is as follows.

A resin composition was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

This amorphous sample was subjected to an annealing treatment for prescribed periods of time at 140° C. in a dryer to prepare plural samples different in degree of crystallinity.

The crystal melting enthalpies [J/g] of the resultant samples were evaluated at a heating rate of 20° C./min by a differential scanning calorimeter (DSC). Here, the smaller crystal melting enthalpy indicates the smaller degree of crystallinity. Accordingly, it follows that a resin is harder to be crystallized as the crystal melting enthalpy is smaller so far as the annealing time is the same.

Example 1

A mixture obtained by mixing 99.5 parts by weight of polyethylene furandicarboxylate and 0.5 parts by weight of sodium montanate was provided. The mixture was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 40 minutes was 15 [J/g], and the crystallization progressed at a rate of 0.38 [J/g·min].

Example 2

A mixture obtained by mixing 99 parts by weight of polyethylene furandicarboxylate and 1 part by weight of sodium montanate was provided. The mixture was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 40 minutes was 15 [J/g], and the crystallization progressed at a rate of 0.38 [J/g·min].

Example 3

A mixture obtained by mixing 97 parts by weight of polyethylene furandicarboxylate and 3 parts by weight of sodium montanate was provided. The mixture was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 40 minutes was 3 [J/g], and the crystallization progressed at a rate of 0.08 [J/g·min].

Example 4

A mixture obtained by mixing 95 parts by weight of polyethylene furandicarboxylate and 5 parts by weight of sodium montanate was provided. The mixture was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 40 minutes was 3 [J/g], and the crystallization progressed at a rate of 0.08 [J/g·min].

Example 5

A mixture obtained by mixing 90 parts by weight of polyethylene furandicarboxylate and 10 parts by weight of sodium montanate was provided. The mixture was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 40 minutes was 3 [J/g], and the crystallization progressed at a rate of 0.08 [J/g·min].

Comparative Example 1

100 parts by weight of polyethylene furandicarboxylate was charged into a Laboplastmill mixer (trade name: blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 40 minutes was 39 [J/g], and the crystallization progressed at a rate of 0.98 [J/g·min]. The crystallization rate was 12 times higher compared with Example 4.

Comparative Example 2

100 parts by weight of a polylactic acid resin was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The results of the crystallization-accelerating test on the thus-prepared amorphous sample and samples subjected to the annealing treatment were illustrated in FIG. 1. The crystal melting enthalpy at the annealing time of 10 minutes was 33 [J/g], and the crystallization progressed at a rate of 3.3 [J/g·min]. The crystallization rate was 41.3 times higher compared with Example 4.

The results of the crystallization rate in the crystallization-accelerating test of the resin compositions of Examples and Comparative Examples are shown in Table 1.

TABLE 1

|  | Crystallization rate in acceleration test [J/g · min] |
|---|---|
| Example 1 | 0.38 |
| Example 2 | 0.38 |
| Example 3 | 0.08 |
| Example 4 | 0.08 |
| Example 5 | 0.08 |
| Comp. Ex. 1 | 0.98 |
| Comp. Ex. 2 | 3.30 |

INDUSTRIAL APPLICABILITY

The present invention is very useful in a wide variety of industrial fields using resin compositions intended to be used as plastic molded products. In particular, since the crystallization-inhibiting effect is more improved than the prior art, physical properties and appearance can be retained over a long period of time when molded products of a resin composition using a plant-derived resin as a raw material are used in an amorphous state. When the resin composition is used in an amorphous state, productivity upon molding is superior to the case where the resin composition is crystallized before use, so that the present invention is also useful in improvement of productivity in industrial fields using plant-derived plastics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-042179, filed Feb. 22, 2008, which is hereby incorporated by reference herein in its entirety.

The invention claimed is:

1. A resin composition comprising poly(ethylene furandicarboxylate) and sodium montanate.

2. The resin composition according to claim 1, wherein the content of the sodium montanate is from 0.5 parts by weight or more to 10 parts by weight or less per 100 parts by weight of the total of the poly(ethylene furandicarboxylate) and the sodium montanate.

3. A molded article molded with the resin composition according to claim 1.

4. The resin composition according to claim 1, wherein the poly(ethylene furandicarboxylate) is amorphous.

* * * * *